US009060357B2

(12) United States Patent
Ji et al.

(10) Patent No.: US 9,060,357 B2
(45) Date of Patent: Jun. 16, 2015

(54) METHOD AND APPARATUS FOR TRANSMITTING UPLINK AND DOWNLINK DATA IN TDD SYSTEM

(71) Applicant: Samsung Electronics Co. Ltd., Suwon-si, Gyeonggi-do (KR)

(72) Inventors: Hyoungju Ji, Seoul (KR); Joonyoung Cho, Suwon-si (KR); Seunghoon Choi, Suwon-si (KR); Youngbum Kim, Seoul (KR); Juho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 199 days.

(21) Appl. No.: 13/767,447

(22) Filed: Feb. 14, 2013

(65) Prior Publication Data

US 2013/0208634 A1 Aug. 15, 2013

Related U.S. Application Data

(60) Provisional application No. 61/598,466, filed on Feb. 14, 2012, provisional application No. 61/603,459, filed on Feb. 27, 2012, provisional application No. 61/607,694, filed on Mar. 7, 2012.

(51) Int. Cl.
*H04W 4/00* (2009.01)
*H04W 72/04* (2009.01)
*H04L 1/18* (2006.01)
*H04W 72/12* (2009.01)
*H04W 76/02* (2009.01)

(52) U.S. Cl.
CPC ......... *H04W 72/0406* (2013.01); *H04W 72/12* (2013.01); *H04L 1/1812* (2013.01); *H04L 1/1887* (2013.01); *H04W 76/02* (2013.01)

(58) Field of Classification Search
USPC ......................... 370/328–339, 350
See application file for complete search history.

(56) References Cited

U.S. PATENT DOCUMENTS

| | | | | |
|---|---|---|---|---|
| 2012/0320840 A1* | 12/2012 | Kim et al. | | 370/329 |
| 2012/0327821 A1* | 12/2012 | Lin et al. | | 370/280 |
| 2013/0136108 A1* | 5/2013 | Cheng et al. | | 370/336 |

(Continued)

OTHER PUBLICATIONS

Huawei, Hisilicon, 3GPP TSG RAN WG1 Meeting #67, R1-114088, HARQ Timing Design for TDD Inter-band CA with Different UL-DL Configurations, Nov. 14-18, 2011, San Francisco, CA.

(Continued)

*Primary Examiner* — Frank Duong
(74) *Attorney, Agent, or Firm* — Jefferson IP Law, LLP

(57) ABSTRACT

A method and an apparatus for transmitting uplink/downlink data on Time Division Duplexing (TDD) carriers are provided. The method includes transmitting to a base station in a Primary Cell (PCell) and a Secondary Cell (SCell), a TDD Uplink-Downlink (UL-DL) configuration of the PCell having a DL subframe super-set or UL subset that are common in the SCell and the PCell and a TDD UL-DL configuration differing from each other, receiving data at a first subframe in the SCell, and transmitting, when a UL subframe set of the SCell is a subset of a UL subframe of the PCell, a feedback corresponding to the data at a subframe predefined in association with the first subframe in the PCell according to the TDD UL-DL configuration of the SCell. The method supports both the self-scheduling and cross-carrier scheduling of the UE using carriers of different TDD configurations.

23 Claims, 17 Drawing Sheets

(56) References Cited

U.S. PATENT DOCUMENTS

2013/0195066 A1* 8/2013 Lee et al. .................. 370/329
2014/0029490 A1* 1/2014 Kim et al. .................. 370/280

OTHER PUBLICATIONS

Pantech, 3GPP TSG RAN1 #66bis, R1-113103, Discussion on HARQ Timing for Inter-band CA with Different TDD Configuration, Oct. 10-14, 2011, Zhuhai, China.

Media Tek Inc., 3GPP TSG-RAN WG1 Meeting #67, R1-113864, Discussion on HARQ Feedback Mechanism and Cross-carrier Scheduling in Inter-band CA with Different TDD UL-DL Configurations, Nov. 14-18, 2011, San Francisco, CA.

Intel Corporation, 3GPP TSG-RAN WG1 #67, R1-113951, Discussion on HARQ Feedback of TDD Inter-band Carrier Aggregation, Nov. 14-18, 2011, San Francisco, CA.

LG Electronics, 3GPP TSG RAN WG1 #67, R1-113973, Overall Structure of TDD CA with Different UL-DL Configurations Based on Half-duplex Operation, Nov. 14-18, 2011, San Francisco, CA.

* cited by examiner

FIG. 1
(RELATED ART)

| | | | | | | | | | | |
|---|---|---|---|---|---|---|---|---|---|---|
| TDD conf 0 | D | S | U | U | U | D | S | U | U | U |
| TDD conf 6 | D | S | U | U | U | D | S | U | U | D |
| TDD conf 1 | D | S | U | U | D | D | S | U | U | D |
| TDD conf 2 | D | S | U | D | D | D | S | U | D | D |

101

| | | | | | | | | | | |
|---|---|---|---|---|---|---|---|---|---|---|
| TDD conf 3 | D | S | U | U | U | D | D | D | D | D |
| TDD conf 4 | D | S | U | U | D | D | D | D | D | D |
| TDD conf 5 | D | S | U | D | D | D | D | D | D | D |

| | | | | | | | | | | |
|---|---|---|---|---|---|---|---|---|---|---|
| TDD conf 1 | D | S | U | U | D | D | S | U | U | D |
| TDD conf 3 | D | S | U | U | U | D | D | D | D | D |

⎫201

| | | | | | | | | | | |
|---|---|---|---|---|---|---|---|---|---|---|
| TDD conf 2 | D | S | U | D | D | D | S | U | D | D |
| TDD conf 4 | D | S | U | U | D | D | D | D | D | D |

⎫203

| | | | | | | | | | | |
|---|---|---|---|---|---|---|---|---|---|---|
| TDD conf 3 | D | S | U | U | U | D | D | D | D | D |
| TDD conf 2 | D | S | U | D | D | D | S | U | D | D |

⎫205

METHOD AND APPARATUS FOR TRANSMITTING UPLINK AND DOWNLINK DATA IN TDD SYSTEM

PRIORITY

This application claims the benefit under 35 U.S.C. §119 (e) of a U.S. provisional patent application filed on Feb. 14, 2012 in the U.S. Patent and Trademark Office (USPTO) and assigned Ser. No. 61/598,466, a U.S. provisional patent application filed on Feb. 27, 2012 in the USPTO and assigned Ser. No. 61/603,459, and a U.S. provisional patent application filed on Mar. 7, 2012 in the USPTO and assigned Ser. No. 61/607,694, the entire disclosure of each of which is hereby incorporated by reference.

BACKGROUND OF THE INVENTION

1. Field of the Invention

The present invention relates to a method and an apparatus for transmitting uplink/downlink data on Time Division Duplexing (TDD) carriers. More particularly, the present invention relates to an apparatus for supporting self-scheduling and cross-carrier scheduling of a User Equipment (UE) on carriers with different TDD configurations so as to transmit acknowledgement channels simultaneously regardless of the scheduled carrier.

2. Description of the Related Art

Long Term Evolution (LTE) is an Orthogonal Frequency Division Multiple Access (OFDMA)-based communication standard designed to support both Frequency Division Duplexing (FDD) and TDD. LTE release 8 has been designed to support FDD and TDD on a single carrier and evolved to LTE release 10 which supports both the FDD and TDD. However, it restricts the TDD operation only to the case where the uplink-downlink configuration should be the same across the carriers. In release 11, the work is expected to continue on supporting TDD operation across the carriers with different uplink-downlink configurations.

Table 1 shows the TDD configurations supported in an LTE Rel. 8 system.

TABLE 1

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

As shown in Table 1, a total of 7 configurations are supported with 10 subframes in which D denotes a subframe reserved for downlink transmission, S denotes a special subframe capable of supporting both the downlink and the uplink transmission and having a guard period for switching between uplink and downlink transmission, and U denotes a subframe reserved for uplink transmission. Since the TDD configurations differ from each other in position and number of subframes for uplink transmission, the number of Hybrid Automatic Repeat request (HARQ) processes and transmission timings available for UEs vary depending on the TDD configuration. In order to support this, the Physical Downlink Shared Channel (PDSCH)-HARQ-ACKnowledgement (ACK) timing relationship is defined per TDD configuration in downlink transmission, two timings, scheduling-Physical Uplink Shared Channel (PUSCH) timing for scheduling information transmission and PUSCH-HARQ-ACK timing for data transmission and evolved Node B's (eNB's) ACK channel transmission, are defined in uplink transmission.

1) PDSCH to HARQ-ACK Timing

Table 2 shows timing relationships of TDD configurations.

TABLE 2

| UpLink-DownLink (UL-DL) Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In Table 2, the value 6 for subframe 2 column of configuration 0 indicates that the UE's ACK channel corresponding to the eNB's PDSCH transmission before 6 subframes is transmitted at the 2nd subframe. Table 2 shows the relative time of PDSCH transmission to current uplink ACK channel.

2) Scheduling to PUSCH Timing

Table 3 shows the uplink data channel transmission timing relationship for scheduling of TDD configurations.

TABLE 3

| TDD UL/DL Configuration | subframe number n | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

Table 3 shows the subframe interval of PUSCH transmitted based on the scheduling control channel received at the $n^{th}$ subframe of downlink transmission. For example, if the uplink control channel is received at the $0^{th}$ subframe in the configuration 3, this means that the UE transmits uplink data channel after 4 subframes.

3) PUSCH to HARQ-ACK Timing

Table 4 shows the relationship between PUSCH transmission and eNB's ACK channel transmission timings.

TABLE 4

| TDD UL/DL Configuration | subframe number i | | | | | | | | | |
|---|---|---|---|---|---|---|---|---|---|---|
| | 0 | 1 | 2 | 3 | 4 | 5 | 6 | 7 | 8 | 9 |
| 0 | 7 | 4 | | | | | 7 | 4 | | |
| 1 | | 4 | | | 6 | | | 4 | | 6 |
| 2 | | | | 6 | | | | | 6 | |
| 3 | 6 | | | | | | | | 6 | 6 |
| 4 | | | | | | | | | 6 | 6 |
| 5 | | | | | | | | | 6 | |
| 6 | 6 | 4 | | | | | 7 | 4 | | 6 |

Table 4 shows the ACK channel transmission timing to the UE's PUSCH transmission in which, if the eNB has transmitted the ACK channel at the $0^{th}$ downlink subframe in the configuration 3, this means that the ACK channel is transmitted for the PUSCH transmitted before 6 subframes.

In the downlink HARQ process of an LTE system, which is as asynchronous system, if the erroneous downlink data channel can be retransmitted at a certain timing, erroneous uplink data channel has to be transmitted at a predefined timing in a synchronous manner. This can be a Round Trip Time (RTT) having a value that varies according to the TDD configuration, and if the sum of values at the same position in Tables 3 and 4 is 10, this means that RTT is 10 msec, and otherwise, another RTT can be used. Accordingly, the configurations 1, 2, 3, 4, and 5 are configurations that guarantee the RTT of 10 msec, and the configurations 0 and 6 are the configurations guaranteeing another RTT.

In Release 10, the carrier aggregation technique for using multiple carriers is adopted. Carrier aggregation is a technique in which a UE receives data on multiple carriers. In order to discriminate among carriers, the UE is assigned primary and secondary cells that are referred to as a PCell and an SCell, respectively. The UE can be assigned one downlink and uplink PCell and multiple downlink and uplink SCells. In order to support data communication on multiple carriers, there are two scheduling schemes, i.e., self-scheduling and cross-carrier scheduling.

1) Self Scheduling

The self-scheduling is a method for transmitting, by the eNB, different control channels to the UEs on corresponding carriers. The downlink control channel is transmitted at a control channel region of each carrier separately while the data channel is transmitted through the same carrier on which the data channel has been received. However, the ACK channel of the UE is transmitted only in the PCell to minimize the uplink interference and transmit the ACK channels as multiplexed. In transmitting downlink ACK channel, the ACK channel is transmitted on the carrier where the control channel for downlink scheduling has been transmitted.

2) Cross-Carrier Scheduling

The cross-carrier scheduling is a method for receiving the control channel on a single carrier and for transmitting data channel on multiple carriers. The data channel for scheduling is transmitted through the PCell, and the data channel can be transmitted on all channels while the ACK channels of both the UE and the eNB are transmitted through the PCell.

In Rel. 10, since the carrier aggregation is supported only for the same TDD configuration, the downlink and uplink transmission timings are identical across carriers and if the PCell has uplink and the SCell has uplink and vice versa such that it is possible to support the above-described self-scheduling and cross-carrier scheduling. In the case of aggregating carriers with different TDD configurations, the carrier aggregation can be supported depending on the TDD configurations, the supportability can be determined through super-set/subset relationship.

FIG. 1 illustrates a TDD configuration with a super-set/subset relationship according to the related art, and FIG. 2 illustrates a TDD configuration without a super-set/subset relationship according to the related art.

Referring to FIG. 1, in a case of part 101 and in a case of part 103, there are UL subset and DL subset relationships among the TDD configurations 0, 6, 1, and 2. For example, the configuration 0 is a UL super-set of the configurations 6, 1, and 2, and the configuration 2 is a UL subset and DL super-set of the configurations 1, 6, and 0 simultaneously.

Referring to FIG. 2, In a case of part 201, there are no super-set/subset relationships between TDD configurations 1 and 3. In a case of part 203, there is no super-set/subset relationship between the TDD configurations 2 and 4. In addition, in a case of part 205, there is no super-set/subset relationship between the TDD configurations 3 and 2. For example, these three combinations are not fulfilling both the DL subset and the UL subset.

Such combinations make it possible to determine whether the cross-carrier scheduling and self-scheduling can be supported depending on the type of combination. For example, if the DL of the PCell is the super-set of the SCell, the eNB supports the cross-carrier scheduling in DLs of all the SCells, and if UL super-set is DL at the PCell's UL timing, it is difficult to schedule the corresponding DL subframe. Accordingly, the self-scheduling or the cross-carrier scheduling defined in Rel. 10 can be applied to the cases of using different TDD configurations in Rel. 11 without modification in the following cases.

1) The timing of the PCell follows HARQ process timing of uplink of the PCell regardless of self-scheduling and cross-carrier scheduling.
2) In a case of self-scheduling, the uplink HARQ process timing of the SCell follows the SCell timing regardless of a super-set/subset relationship.
3) In a case of cross-carrier scheduling, the downlink HARQ process timing of the SCell follows the timing of the PCell if the SCell is DL subset of the PCell.
4) In a case of cross-carrier scheduling, the uplink HARQ processing timing of the SCell follows the timing of the PCell if the SCell is the UL subset of the PCell and the UL RTT of the PCell is 10 msec.

In the above 4 cases, the scheduling can be supported without modification, but for other cases of combinations, modification may be imperative.

Therefore, a need exists for an apparatus for supporting self-scheduling and cross-carrier scheduling of a UE on carriers with different TDD configurations so as to transmit acknowledgement channels simultaneously regardless of the scheduled carrier.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for supporting self-scheduling and cross-carrier scheduling of a User Equipment (UE) on carriers with different Time Division Duplex (TDD) configurations so as to transmit acknowledgement channels simultaneously regardless of the scheduled carrier.

The objects of the present invention are not limited to the aforesaid, and other objects not described herein will be clearly understood by those skilled in the art from the descriptions below.

In accordance with an aspect of the present invention, a feedback method of a terminal in a TDD system is provided. The method includes establishing connections with a base station in a Primary Cell (PCell) and a Secondary Cell (SCell), a TDD Uplink-Downlink (UL-DL) configuration of the PCell and a TDD UL-DL configuration of the SCell differing from each other, receiving data at a first subframe in the SCell, and transmitting, when a UL subframe set of the SCell is a subset of a UL subframe of the PCell, a feedback corresponding to the data at a subframe predefined in association with the first subframe in the PCell according to the TDD UL-DL configuration of the SCell.

In accordance with another aspect of the present invention, a feedback reception method of a base station in a TDD system is provided. The method includes establishing connections with a terminal in a PCell and an SCell, a TDD UL-DL configuration of the PCell and a TDD UL-DL configuration of the SCell differing from each other, transmitting data at a first subframe in the Scell, and receiving, when a UL subframe set of the SCell is a subset of a UL subframe of the PCell, a feedback corresponding to the data at a subframe predefined in association with the first subframe in the PCell according to the TDD UL-DL configuration of the SCell.

In accordance with another aspect of the present invention, a terminal for transmitting a feedback in a TDD system is provided. The terminal includes a transceiver for transmitting to a base station in a PCell and an SCell, a TDD UL-DL configuration of the PCell and a TDD UL-DL configuration of the SCell differing from each other, for receiving data at a first subframe in the SCell, and for transmitting, when a UL subframe set of the SCell is a subset of a UL subframe of the PCell, a feedback corresponding to the data at a subframe predefined in association with the first subframe in the PCell according to the TDD UL-DL configuration of the SCell.

In accordance with another aspect of the present invention, a base station for receiving a feedback in a TDD system is provided. The base station includes a transceiver for establishing connections with a terminal in a PCell and an SCell, a TDD UL-DL configuration of the PCell and a TDD UL-DL configuration of the SCell differing from each other, for transmitting data at a first subframe in the SCell, and for receiving, when a UL subframe set of the SCell is a subset of a UL subframe of the PCell, a feedback corresponding to the data at a subframe predefined in association with the first subframe in the PCell according to the TDD UL-DL configuration of the SCell.

In accordance with another aspect of the present invention, a feedback method of a terminal in a TDD system is provided. The method includes establishing connections with a base station in a PCell and an SCell, a TDD UL-DL configuration of the PCell and a TDD UL-DL configuration of the SCell differing from each other, receiving data at a first subframe in the Scell, and transmitting, when a UL subframe set of the SCell is a subset of a UL subframe of the PCell, a feedback corresponding to the data at a subframe predefined in association with the first subframe in the PCell according to the TDD UL-DL configuration of the PCell, wherein no SCell downlink transmission is scheduled in the subframe which is downlink in the TDD UL-DL configuration of the SCell and but not downlink in the TDD UL-DL configuration of the PCell.

In accordance with another aspect of the present invention, a feedback reception method of a base station in a TDD system is provided. The method includes establishing connections with a terminal in a PCell and an SCell, a TDD UL-DL configuration of the PCell and a TDD UL-DL configuration of the SCell differing from each other, transmitting data at a first subframe in the Scell, and receiving, when a UL subframe set of the SCell is a subset of a UL subframe of the PCell, a feedback corresponding to the data at a subframe predefined in association with the first subframe in the PCell according to the TDD UL-DL configuration of the PCell, wherein no SCell downlink transmission is scheduled in the subframe which is downlink in the TDD UL-DL configuration of the SCell and but not downlink in the TDD UL-DL configuration of the PCell.

In accordance with another aspect of the present invention, a terminal for transmitting a feedback in a TDD system is provided. The terminal includes a transceiver for transmitting to a base station in a PCell and an SCell, a TDD UL-DL configuration of the PCell and a TDD UL-DL configuration of the SCell differing from each other, for receiving data at a first subframe in the SCell, and for transmitting, when a UL subframe set of the SCell is a subset of a UL subframe of the PCell, a feedback corresponding to the data at a subframe predefined in association with the first subframe in the PCell according to the TDD UL-DL configuration of the PCell, wherein no SCell downlink transmission is scheduled in the subframe which is downlink in the TDD UL-DL configuration of the SCell and but not downlink in the TDD UL-DL configuration of the PCell.

In accordance with another aspect of the present invention, a base station for receiving a feedback in a TDD system is provided. The base station includes a transceiver for establishing connections with a terminal in a PCell and an SCell, a TDD UL-DL configuration of the PCell and a TDD UL-DL configuration of the SCell differing from each other, for transmitting data at a first subframe in the SCell, and for receiving, when a UL subframe set of the SCell is a subset of a UL subframe of the PCell, a feedback corresponding to the data at a subframe predefined in association with the first subframe in the PCell according to the TDD UL-DL configuration of the PCell, wherein no SCell downlink transmission is scheduled in the subframe which is downlink in the TDD UL-DL configuration of the SCell and but not downlink in the TDD UL-DL configuration of the PCell.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which:

FIG. 1 illustrates a Time Division Duplex (TDD) configuration with a super-set/subset relationship according to the related art;

FIG. 2 illustrates a TDD configuration without a super-set/subset relationship according to the related art;

Throughout the drawings, it should be noted that like reference numbers are used to depict the same or similar elements, features, and structures.

DETAILED DESCRIPTION OF EXEMPLARY EMBODIMENTS

Figure 3:
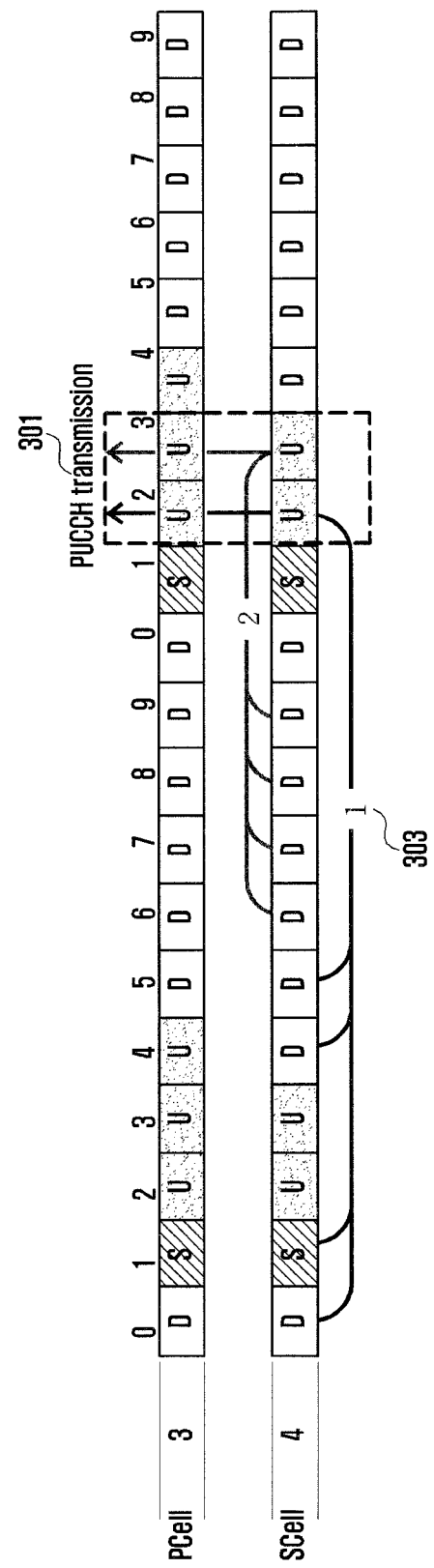
FIG. 3 illustrates a Physical Downlink Shared Channel-Hybrid Automatic Repeat reQuest (PDSCH-HARQ) timing relationship when an UpLink (UL) subframe of a Secondary Cell (SCell) is a subset of a Primary Cell (PCell) according to an exemplary embodiment of the present invention.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention relate to a method and an apparatus for supporting self-scheduling and cross-carrier scheduling of a User Equipment (UE) on carriers with different Time Division Duplex (TDD) configurations so as to transmit acknowledgement channels simultaneously regardless of the scheduled carrier.

FIGS. 3 through 17, discussed below, and the various exemplary embodiments used to describe the principles of the present disclosure in this patent document are by way of illustration only and should not be construed in any way that would limit the scope of the disclosure. Those skilled in the art will understand that the principles of the present disclosure may be implemented in any suitably arranged communications system. The terms used to describe various embodiments are exemplary. It should be understood that these are provided to merely aid the understanding of the description, and that their use and definitions in no way limit the scope of the invention. Terms first, second, and the like are used to differentiate between objects having the same terminology and are in no way intended to represent a chronological order, unless where explicitly stated otherwise. A set is defined as a non-empty set including at least one element.

Descriptions of exemplary methods for supporting different TDD configurations are provided below.

1) First Exemplary Embodiment

The first exemplary embodiment relates to a Physical Downlink Shared Channel-Hybrid Automatic Repeat reQuest (PDSCH-HARQ) timing when a Secondary Cell (SCell) is an UpLink (UL) subset of a Primary Cell (PCell) (PDSCH-HARQ timing of self-scheduling of the SCell, if the SCell is the UL subset of the PCell).

FIG. 3 illustrates a PDSCH-HARQ timing relationship when a UL subframe of an SCell is a subset of a PCell according to an exemplary embodiment of the present invention.

Referring to FIG. 3, when the UL subframe of the SCell is a subset of the PCell, the PDSCH HARQ timing follows the SCell timing.

If the UL subframe of the SCell is the subset of the UL subframe of the PCell, the uplink ACKnowledgement (ACK) channel corresponding to the downlink data channel of the SCell occurs in the PCell, as shown in part 301, and at this time, it follows the timing of the PCell. Here, it is impossible to transmit the 4th subframe, although the data channel is transmitted through self-scheduling in the SCell, because there is no ACK channel timing. However, the UL transmission is possible in the PCell due to the UL subset relationship following the timing of the SCell. Accordingly, the first exemplary embodiment proposes the technique for guaranteeing the ACK channel transmission of the UE in the PCell when the UL subframe of the SCell is the subset of the PCell and following the timing of the SCell for guaranteeing the PDSCH transmission in all DownLink (DL) subframes of the SCell. The above described method can be applied to the SCell timing through cross-carrier scheduling in the same manner, as shown in part 303.

2) Second Exemplary Embodiment

The second exemplary embodiment relates to PDSCH-HARQ timing through cross-carrier scheduling when the UL subframe of the SCell is the subset of the PCell (PDSCH-HARQ timing of cross-carrier scheduling of the SCell, if the SCell is the UL subset of the PCell).

Figure 4:
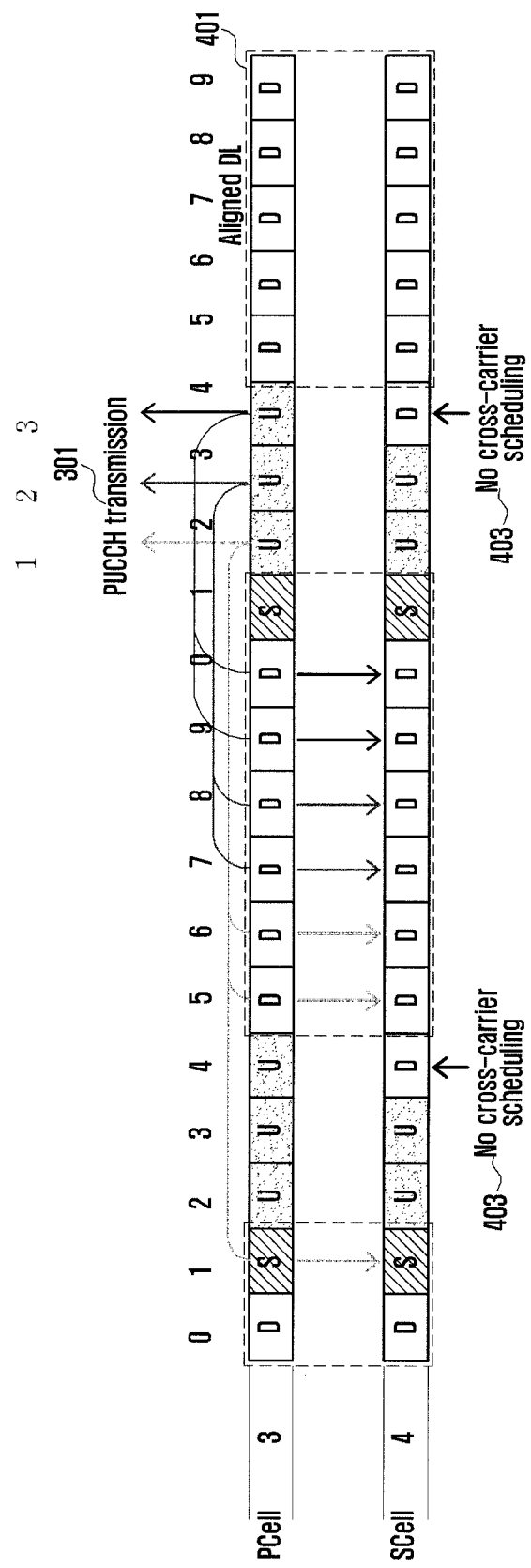
FIG. 4 illustrates a PDSCH-HARQ timing relationship through a cross-carrier scheduling when a UL subframe of an SCell is a subset of a PCell according to a second exemplary embodiment of the present invention.

FIG. 4 illustrates a PDSCH-HARQ timing relationship through a cross-carrier scheduling when a UL subframe of an SCell is a subset of a PCell according to a second exemplary embodiment of the present invention.

Referring to FIG. 4, if the UL subframe of the SCell is the UL subset of the PCell, if the cross-carrier scheduling is supported, if the DL subframe and special subframe of the SCell are aligned with the DL subframe/special subframe of the PCell, as shown in part, the HARQ timing of the corresponding UL follows the PCell timing. In contrast, if the DL subframe and special subframe of the SCell are not aligned with the DL subframe/special subframe of the PCell, as shown in part 403, cross-carrier scheduling is not supported because there is no PCell timing. In this method, since the PCell has more UL subframes, it is advantageous to use the Physical Uplink Control Channel (PUCCH) resource in a distributed way and follow the SCell timing. In a case of using the SCell timing, the control channel for the SCell is not transmitted in some UL subframes of the PCell, resulting in unfairness of resource. Since the non-aligned DL subframe has no PCell timing and UL resource, it is possible to avoid HARQ timing confusion through this and reduce the complexity without defining new timing.

3) Third Exemplary Embodiment

The third exemplary embodiment relates to the UE's uplink data transmission corresponding to the control channel transmission and an evolved Node B's (eNB's) ACK channel transmission timings when the DL subframe of the SCell is the DL subset of the PCell (Scheduling-Physical Uplink Shared Channel (PUSCH)-HARQ timing of cross-carrier scheduling of the SCell, if the SCell is the DL subset of the PCell).

Figure 5:
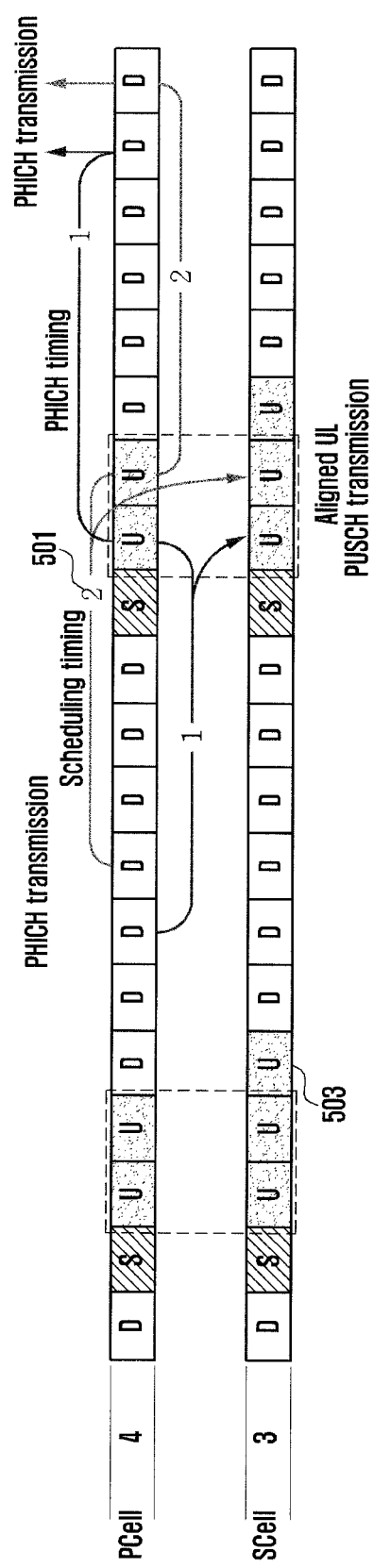
FIG. 5 illustrates a timing relationship between an uplink data channel transmission of a User Equipment (UE) and an acknowledgement channel transmission of an evolved Node B (eNB) when a DL subframe of an SCell is a DL subset of a PCell according to a third exemplary embodiment of the present invention.

FIG. 5 illustrates a timing relationship between an uplink data channel transmission of a UE and an acknowledgement channel transmission of a eNB when a DL subframe of an SCell is a DL subset of a PCell according to a third exemplary embodiment of the present invention.

Referring to FIG. 5, when the UL subframe of the SCell is aligned with the UL subframe of the PCell, as shown in part 501, the HARQ timing of the corresponding UL follows the PCell timing. In contrast, when the UL subframe of the SCell is not aligned with the UL subframe of the PCell, as shown in part 503, and when the Physical Downlink Control Channel (PDCCH) and Physical Hybrid-ARQ Indicator Channel (PHICH) for the corresponding UL process can be transmitted in the PCell, the HARQ timing of the corresponding UL follows the SCell timing. This makes it possible to use, when the UL subframe of the SCell is aligned with the UL subframe of the PCell, the resource of the PCell maximally using the PCell timing, to allow PCell DL transmission when PDCCH and PHICH for PUSCH of the SCell follows the SCell timing, and to follow the SCell timing only when PHICH resource exists in the DL subframe. This also makes it possible to maximize the scheduling efficiency, when the UL subframe of the SCell is not aligned with the UL subframe of the PCell, if it is imperative to follow the SCell because of no PCell timing to follow, and if the PDCCH and PHICH transmission is possible at corresponding timing. However, if the PDCCH and PHICH transmission is impossible, scheduling is not performed.

4) Fourth Exemplary Embodiment

The fourth exemplary embodiment relates to the SCell timing of UE's ACK channel corresponding to PDSCH in self-scheduling when the SCell is neither the DL subset nor the UL subset of the PCell (PDSCH-HARQ timing of self-scheduling of the SCell, if the SCell is not the DL subset nor the UL subset of the PCell).

Figure 6:
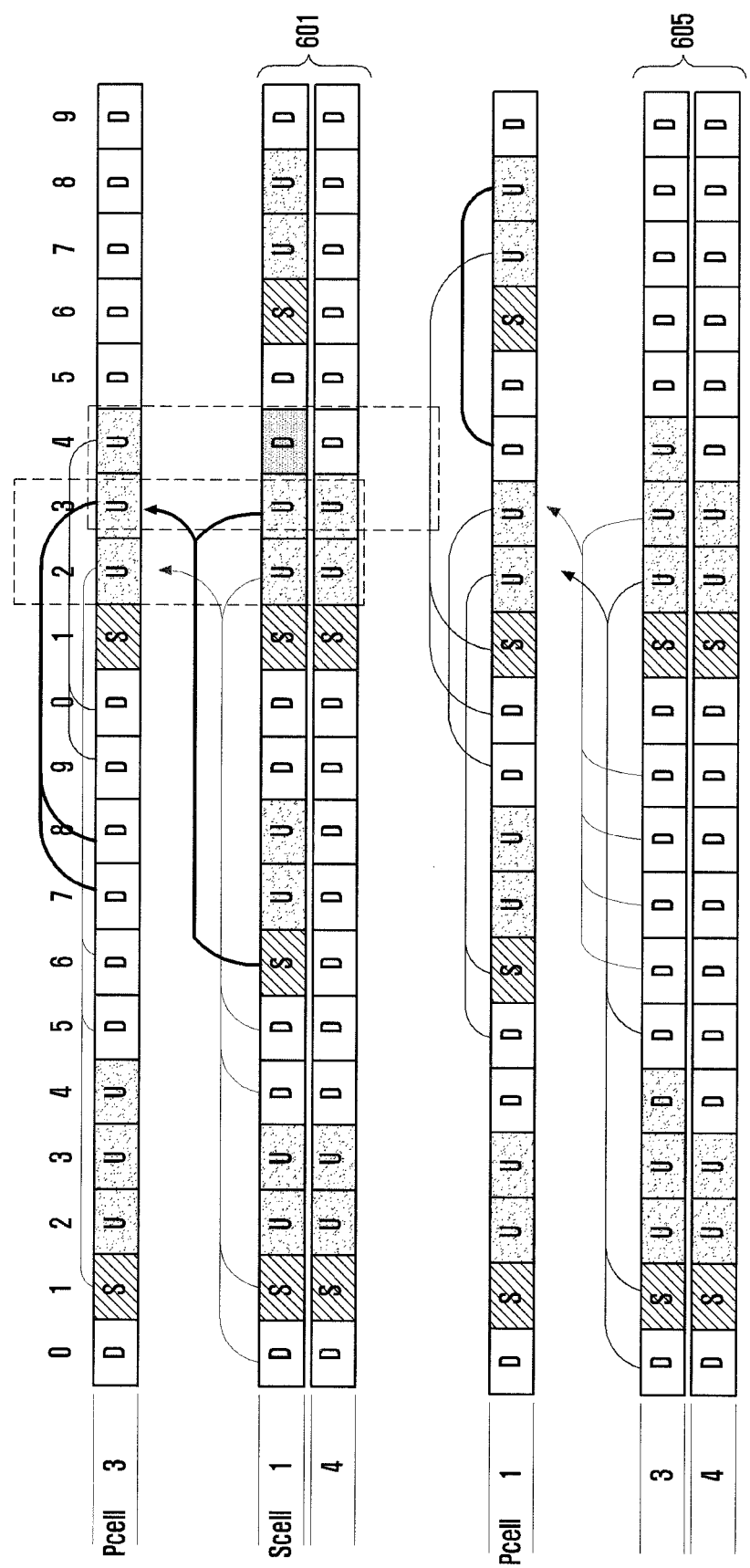
FIG. 6 illustrates an SCell timing relationship between a PDSCH and a UE's acknowledgement channel with self-scheduling when an SCell is neither a DL subset nor a UL subset of a PCell according to a fourth exemplary embodiment of the present invention.

FIG. 6 illustrates an SCell timing relationship between a PDSCH and a UE's acknowledgement channel with self-scheduling when an SCell is neither a DL subset nor a UL subset of a PCell according to a fourth exemplary embodiment of the present invention.

Referring to FIG. 6, in a case of configurations 3-1, 2-3, and 2-4 aggregations where the self-scheduling is performed in the SCell and, if it follows the PCell, the DL subframe of the SCell not aligned with the PCell has no PCell timing and thus, scheduling cannot be performed. Otherwise, if it follows the SCell, it becomes impossible to transmit the PDSCH of the SCell of which ACK channel has to be transmitted at the timing of UL subframe of the SCell not aligned with the PCell. Accordingly, in the fourth exemplary embodiment, the PDSCH of the SCell is scheduled through the self-scheduling, and the ACK channel corresponding to this follows the PDSCH-HARQ timing of the TDD configuration having the DL subframe super-set or UL subset that are common in the SCell and the PCell.

In a case of aggregation of carriers with configurations 1 and 3, as shown in parts 601 and 605, the configurations 4 and 5 are UL subset and DL super-set of the configurations 1 and 3. In this case, since the downlink of the SCell is the subset of the configuration 4 and the ACK channel transmission timing for this is aligned with the UL subset of the configuration 4, it becomes possible to transmit data through self-scheduling in the DL subframe of all the SCell.

For example, it is possible to use the timings of the configuration 4 or 5 for the combination of the configurations 3 and 1, configuration 5 for the combination of the configurations 2 and 3, and configuration 5 for the combination of the configurations 2 and 4. The exemplary cases of using the timings of configuration 5 in the SCell for combinations of configurations 1 and 3, 2 and 3, and 2 and 4 can be used.

5) Fifth Exemplary Embodiment

The fifth exemplary embodiment relates to the PDSCH-HARQ timing of the SCell through the self-scheduling when the DL of the SCell is neither the subset of the PCell nor the UL subset.

Figure 7:
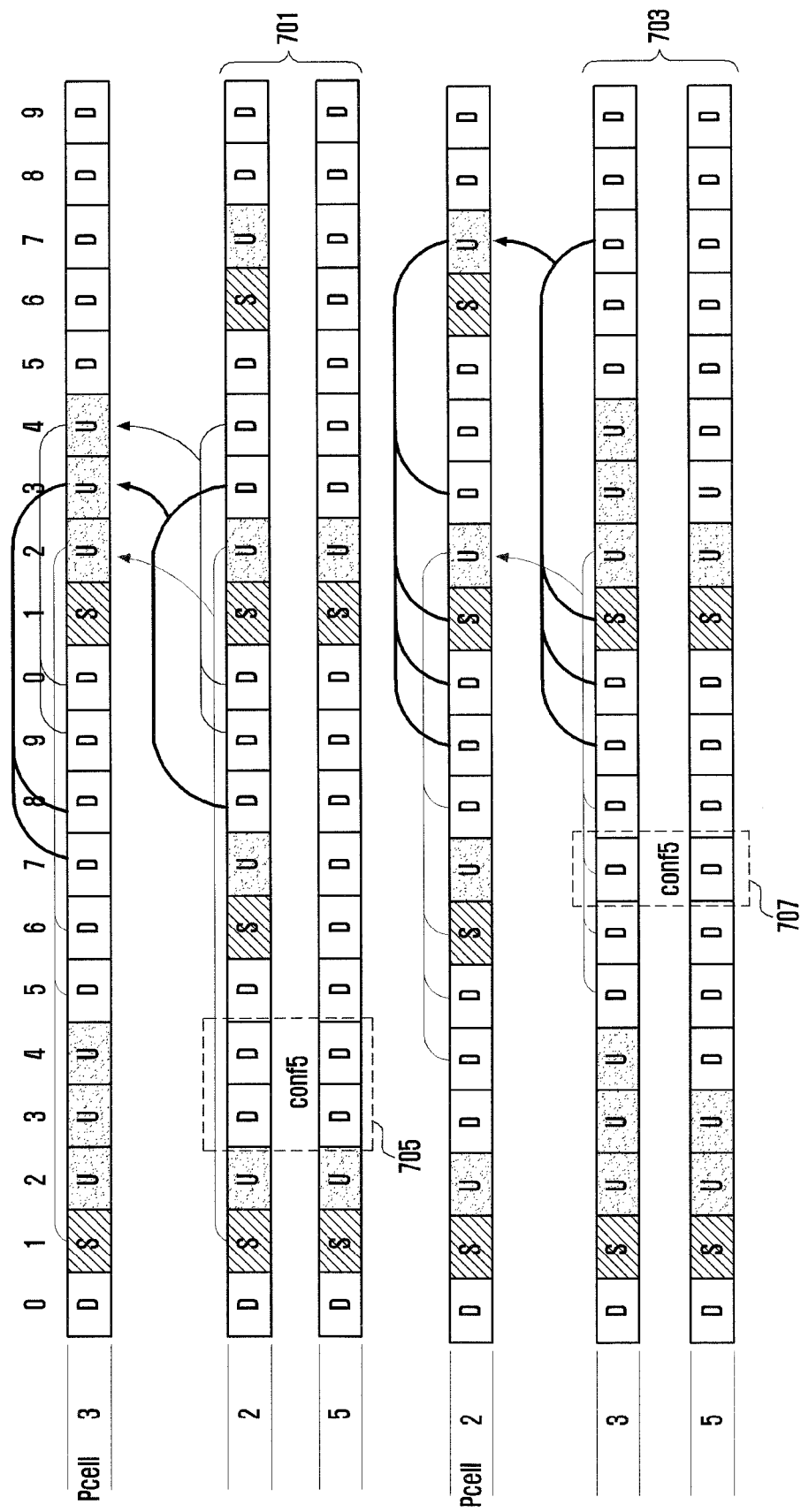
FIG. 7 illustrates a PDSCH-HARQ timing relationship of an SCell with self-scheduling when the SCell is neither a DL subset nor a UL subset of a PCell according to a fifth exemplary embodiment of the present invention.

FIG. 7 illustrates a PDSCH-HARQ timing relationship of an SCell with self-scheduling when the SCell is neither a DL subset nor a UL subset of a PCell according to a fifth exemplary embodiment of the present invention.

The fifth exemplary embodiment is advantageous in that the downlink subframes of all SCells can be scheduled in the same situation as the fourth exemplary embodiment. However, if the PCell has configuration 3 and the SCell has the configuration 1, the ACK channel of the UE for subframe 0 in the PCell is transmitted at the subframe 4 but in the SCell transmitted at the subframe 2, as shown in FIG. 6. In this case, since although the eNB scheduler instructs data transmissions simultaneously, the ACK channels are received at different timings, and thus, if the retransmission occurs continuously, the delay between the two data transmissions increases, resulting in increase of scheduling complexity. In order to address this problem, the fifth exemplary embodiment proposes a method for following the timing of the PCell when the DL subframe of the SCell is aligned with the PCell and following the PDSCH-HARQ timing of the configuration having the DL subframe super-set or UL subset that are common in the SCell and the PCell with the configurations aggregated when the DL subframe of the SCell is not aligned with the timing of the PCell. In this case, it is possible to secure the advantage of the fourth exemplary embodiment in that all DL subframes of the SCell can be scheduled and the advantage in that the HARQ timing ends at the same time.

Referring to FIG. 7, as shown in parts 701 and 703, when the carriers with configurations 3 and 2 are aggregated, the DL super-set or UL subset common in the PCell and the SCell follow configuration 5, and the SCell following the timing of the configuration 5 only in the part where it is not DL-aligned with the PCell, as shown in parts 705 and 707. In this way, if the PCell uses configuration 3 and the SCell uses configuration 2, the ACK channels of the UE are transmitted in both the PCell and the SCell in timing order of scheduling.

6) Sixth Exemplary Embodiment

The sixth exemplary embodiment relates to the scheduling-PUSCH-HARQ timing through cross-carrier scheduling when the SCell is the DL subset but not the UL subset of the PCell.

Figure 8:
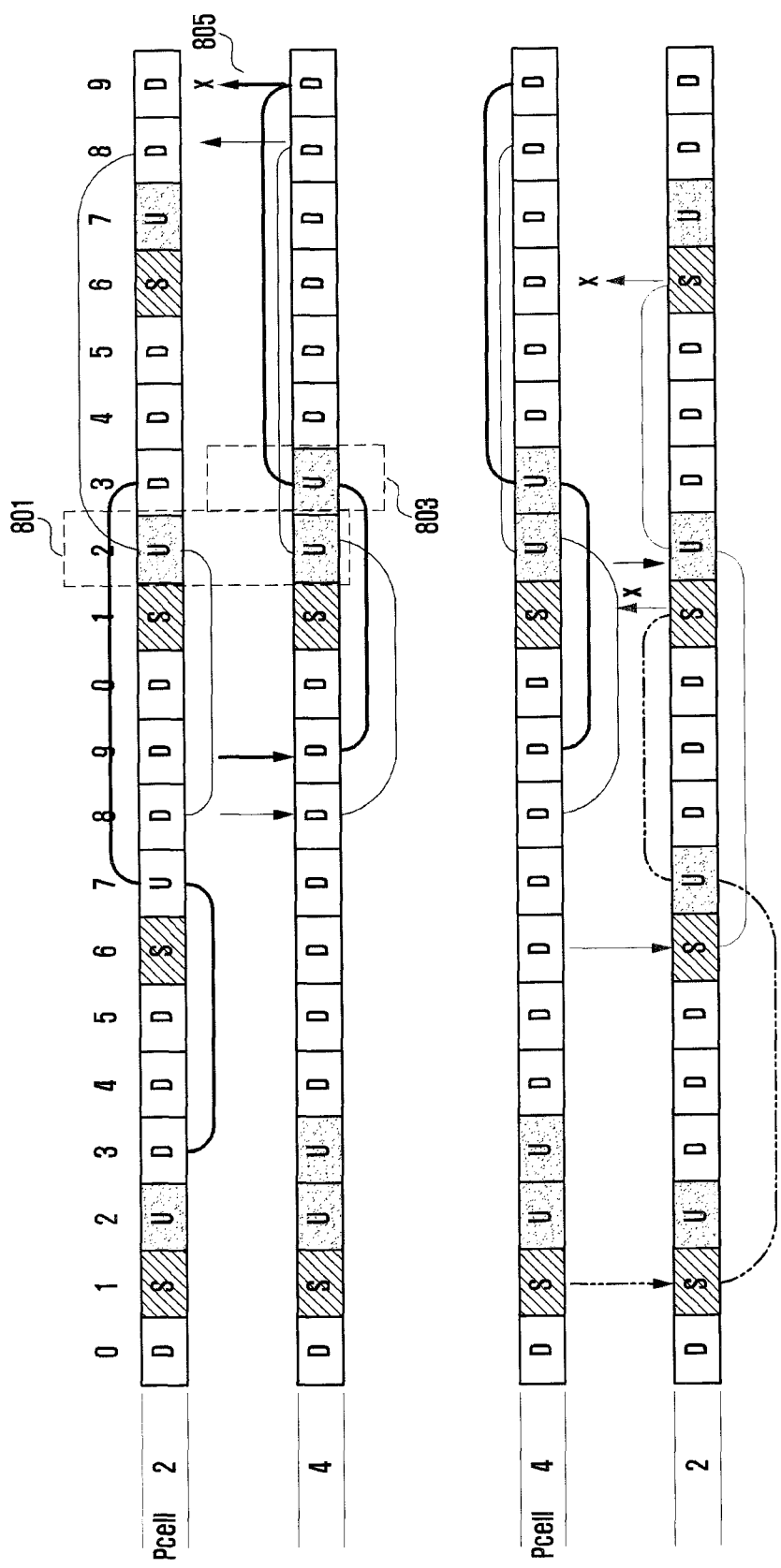
FIG. 8 illustrates a scheduling-Physical Uplink Shared Channel (PUSCH)-HARQ timing relationship with a cross-carrier scheduling when an SCell is a DL subset but not a UL subset of a PCell according to a sixth exemplary embodiment of the present invention.

FIG. 8 illustrates a scheduling-PUSCH-HARQ timing relationship with cross-carrier scheduling when an SCell is a DL subset but not a UL subset of a PCell according to a sixth exemplary embodiment of the present invention.

Referring to FIG. 8, since the SCell and the PCell has no UL subset or DL subset relationship, the HARQ timing relationship for uplink data channel transmission through cross-carrier scheduling can be used as follows. If the UL subframe of the SCell is aligned with the UL subframe of the PCell, the HARQ timing of the SCell follows the timing of the PCell. Otherwise, if the UL subframe of the SCell is not aligned with the UL subframe of the PCell, the UL HARQ timing through cross-carrier scheduling of the SCell follows the SCell or SCell's UL super-set timing This is the method for the case where the PHICH transmission resource is prepared in the PCell at the corresponding UL process timing or the ACK channel resource for E-PHICH other than PHICH of the related art is prepared.

As shown in FIG. 8, the carriers using configurations 2 and 4 can be aggregated. If the UL PUSCH transmission is performed with the cross-carrier scheduling and if the UL is aligned between the PCell and the SCell as shown in part 801 of FIG. 8, it is possible to follow the timing of the PCell. If the ACK channel and data channel transmission are possible at the same timing with the PCell and if the UL is not aligned, as shown in part 803, it is possible to follow the third configuration or the SCell timing. This is because there can be a situation of no PHICH transmission resource in the PCell, as shown in part 805, and the transmission is possible only when such resource is guaranteed or the ACK channel resource, such as E-PHICH different from the channel of the related art is guaranteed. Otherwise, the corresponding UL process cannot be scheduled.

7) Seventh Exemplary Embodiment

The seventh exemplary embodiment relates to the PDSCH HARQ timing of the SCell with self-scheduling when the SCell is the UL subset of the PCell.

Figure 9:
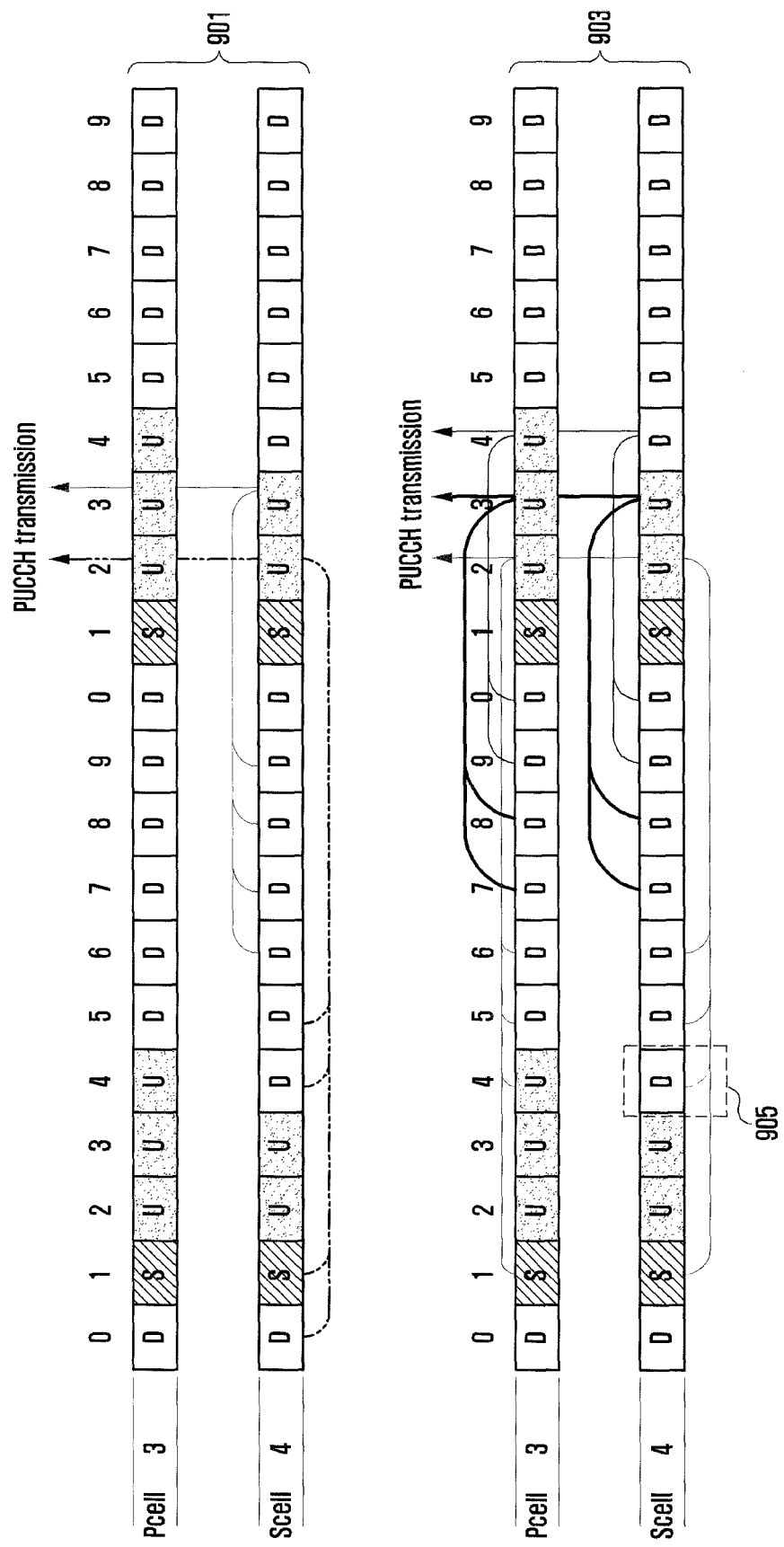
FIG. 9 illustrates a PDSCH HARQ timing relationship of an SCell with self-scheduling when the SCell is a UL subset of a PCell according to a seventh exemplary embodiment of the present invention.

FIG. 9 illustrates a PDSCH HARQ timing relationship of an SCell with self-scheduling when the SCell is a UL subset of a PCell according to a seventh exemplary embodiment of the present invention.

Referring to FIG. 9, part 901 shows an example of following the timing of the SCell for the PDSCH HARQ timing of the SCell when the SCell is the UL subset of the PCell and the self-scheduling is applied as in the first exemplary embodiment. This is advantageous in scheduling all the SCell downlink subframes but has a problem in that the scheduling timing of the PCell and the SCell mismatch the ACK channel timing.

In order to avoid this problem, it is applied to follow the PCell timing when the SCell is the UL subset of the PCell and the self-scheduling is used and the PDSCH HARQ timing of the SCell is aligned with the DL subframe of the PCell and the SCell and follow the SCell timing when the PDSCH HARQ timing of the SCell is not aligned, as shown in part 903.

In this case, the ACK channel occurs at the same timing as the scheduling timing, as shown in part 903, and even in the case not aligned, as shown in part 905, the order of the ACK channels corresponding to the data channels occurring before and after match with the data channel occurrence order so as to avoid the increase of the scheduling complexity caused by the mismatch between the PCell and the SCell.

8) Eighth Exemplary Embodiment

The eighth exemplary embodiment relates to scheduling-PUSCH-HARQ timing when the SCell is a UL subset of the PCell and a Round Trip Time (RTT) of the PCell is not the period of 10 msec.

In the above-described first to seventh exemplary embodiments, the RTT of the PCell is maintained as 10 msec equal to the length of radio frame and thus, the cross-carrier scheduling can be applied even though the SCell has a configuration different from that of the PCell.

In the Long Term Evolution (LTE) system, however, the TDD configurations 0 and 6 may have 70 msec and 60 msec, respectively, for supporting n+1 HARQ processes with n UL subframes. Accordingly, the TDD configuration 0 has total 6 UL subframes per 10 msec to handle total 7 UL HARQ processes, as shown in 1401 of FIG. 10. In a case of TDD configuration 6, total 5 UL subframes exist for handling total 7 UL HARQ processes.

Figure 10:
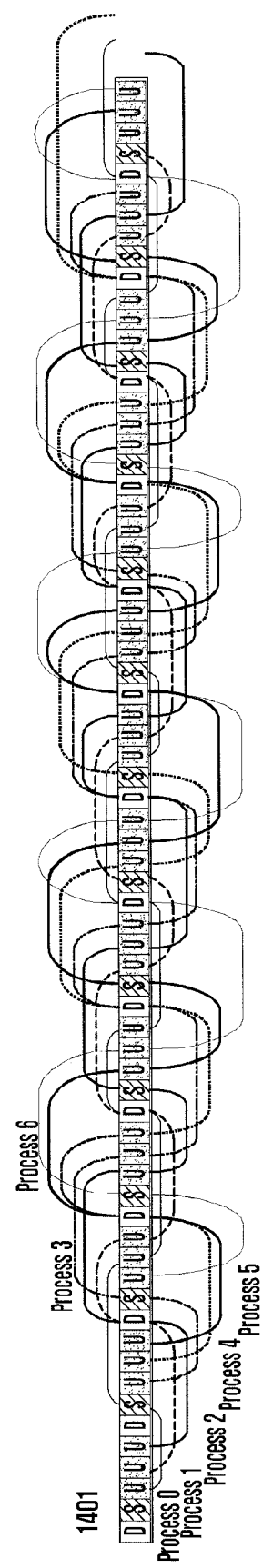
FIG. 10 illustrates a UL HARQ for a Round Trip Time (RTT) of 70 msec in a TDD configuration Oaccording to an exemplary embodiment of the present invention.

FIG. 10 illustrates a UL HARQ for an RTT of 70 msec in a TDD configuration 0 according to an exemplary embodiment of the present invention.

Referring to FIG. 10, in the TDD configuration 0, the UL HARQ starting at the #2nd subframe performs transmission at the #4th subframe of the next radio frame and performs retransmission at different frames before 70 msec elapses since the initial transmission. Accordingly, when the SCell differs from the PCell in configuration, if the number of UL subframes is less than that of the PCell, it is impossible to follow the PCell's transmission timings for all retransmission. This means that it is difficult to support scheduling completely if the RTT of the SCell does not match the RTT of the PCell when the RRT of the PCell is not 10 msec. Since the configuration 6 has the RTT of 60 msec, this is the case.

In order to address this problem, the eighth exemplary embodiment is implemented in such a way of setting the RTT of the SCell to 10 msec when the UL HARQ RTT of the PCell is not 10 msec and the cross-carrier scheduling is applied to UL subframe of the SCell. For example, it is possible to follow the timing of the PCell as scheduling to PUSCH timing when the SCell is aligned in at least one of the subframes 2, 4, and 7 with configuration 0, and also follow the timing of the PCell as PUSCH to PHICH timing. In a case of the 2nd and 7th subframes of the SCell, the scheduling is transmitted in the 5th and 1st subframe of the PCell and follows the timing when the Most Significant Bit (MSB) of UL index is 1 in the PCell. In addition, the PHICH corresponding to the PUSCH transmission is transmitted at the 5th and 1st subframes according to the PCell timing such that the RTT of the SCell becomes 10 msec. In a case of 4th subframe of the SCell, the scheduling is transmitted at the $0^{th}$ subframe of the PCell and the acknowledgement channel corresponding to PUSCH is transmitted at $0^{th}$ subframe such that the RTT of the SCell becomes 10 msec.

In view of the UL HARQ of the PCell, the eNB performs different UL HARQ scheduling at every radio frame for PUSCH transmission in the PCell at the $0^{th}$ or 1st or 5th subframe, however, the eNB uses the same UL HARQ process at this time. The PHICH transmission timing is of an acknowledgement channel for the same UL HARQ at the same DL subframe index in the SCell but acknowledgement channel corresponding to different UL HARQ process in the PCell. For example, the PUSCH-PHICH timing of the SCell is acquired by cyclic shifting different PCell UL HARQ timing.

If the PHICH is received initially at the same timing as the PHICH transmission timing of PHICH of the $n^{th}$ UL HARQ of the PCell, the reception is performed at the same timing as the PHICH transmission of $(n-1)^{th}$ UL HARQ in the next retransmission. If the PHICH is received initially at the PHICH transmission timing of the $n^{th}$ UL HARQ of the PCell, the reception is performed at the same timing as the PHICH transmission of the $(n-1)^{th}$ UL HARQ in the next retransmission. In this way, the cross-carrier scheduling can be applied by maintaining the SCell RTT as 10 msec even when the PCell RTT is not 10 msec. This process can be operated as described follows.

Figure 11:
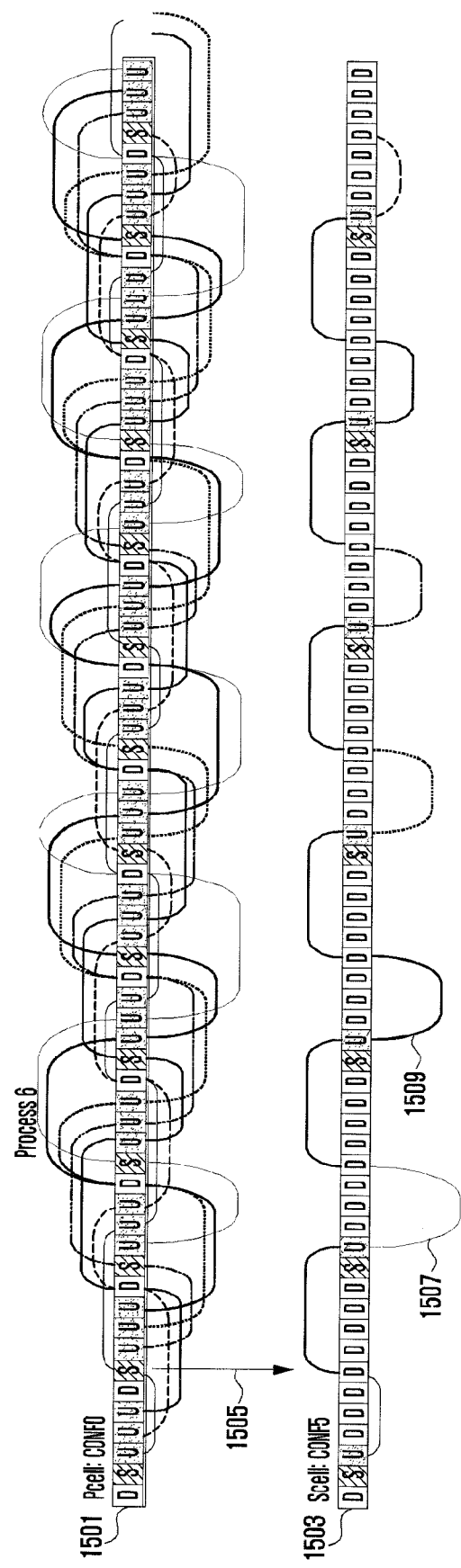
FIG. 11 illustrates a scheduling-PUSCH-HARQ timing relationship when an SCell is a UL subset of a PCell and the PCell RTT is not 10 msec according to an eighth exemplary embodiment of the present invention.

FIG. 11 illustrates a scheduling-PUSCH-HARQ timing relationship when an SCell is a UL subset of a PCell and the PCell RTT is not 10 msec according to an eighth exemplary embodiment of the present invention.

Referring to FIG. 11, if the PCell uses the configuration 0 as shown in part 1501 and the SCell uses the configuration 5 as shown in part 1503, the aligned UL subframe is #2. In this case, if the cross-carrier scheduling occurs at the #6th subframe in the PCell, as shown in part 1505, the PUSCH transmission occurs after 6 or 7 subframes according to the UL index. In the case of the SCell, it may be imperative to indicate in the UL grant that the PUSCH occurs after 6 subframes for maintaining the RTT of 10 msec.

At this time, simultaneous PUSCH may occur at the subframe after 6th subframe or at the 7th subframe according to the UL index of UL grant for the PCell. Once the PUSCH has been transmitted at the subframe after 6th subframe of the SCell, the PHICH is transmitted at the same time as the PHICH transmission timing of the UL HARQ of the PCell in which the corresponding UL PUSCH is transmitted, as denoted by reference number 1507. In this case, the PHICH transmission timing matches different PHICH transmission timing of the PCell UL HARQ at every time in retransmission, as denoted by reference number 1509.

Figure 12:
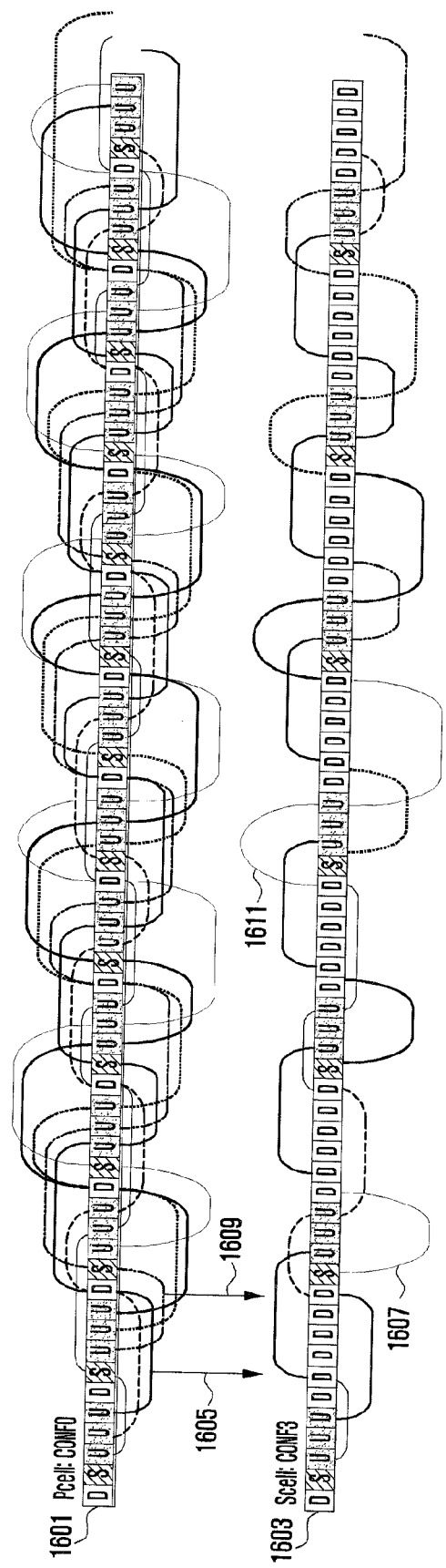
FIG. 12 illustrates a scheduling-PUSCH-HARQ timing relationship when an SCell is a UL subset of a PCell and the PCell RTT is not 10 msec according to the eighth exemplary embodiment of the present invention.

FIG. 12 illustrates a scheduling-PUSCH-HARQ timing relationship when an SCell is a UL subset of a PCell and the PCell RTT is not 10 msec according to the eighth exemplary embodiment of the present invention.

Referring to FIG. 12, the PCell uses TDD configuration 0 while the SCell uses TDD configuration 3. The PCell operates with the configuration 0 and RTT of 70 msec, as shown in part 1601, while the SCell operates with the configuration 3, as shown in part 1603. The cross-carrier scheduling is performed in the same way of FIG. 11 at subframe #2 but, at the subframe #4, the UL grant is transmitted at $0^{th}$ subframe, as shown in part 1609, such that the PUSCH occurs after 4 subframes based on the UL index. At this time, the acknowledgement channel transmission timing follows the PCell timings as shown in FIG. 11 in a way of occurring at the same time as the different UL HARQ PHICH transmission of the PCell so as to maintain the SCell RTT as 10 msec. Parts 1605, 1607, and 1611 correspond to parts 1505, 1507, and 1509, respectively, of FIG. 11.

This exemplary embodiment is capable of performing the cross-carrier scheduling in the SCell by maintaining the SCell RTT as 10 msec without defining new timing so as to make it possible to configure the PCell with the TDD configuration 0.

9) Ninth Exemplary Embodiment

The ninth exemplary embodiment relates to the UL HARQ timing of the SCell in cross-carrier scheduling when the SCell is a UL subset of the PCell which is configured with the configuration 6 and RTT of 60 msec.

Figure 13:
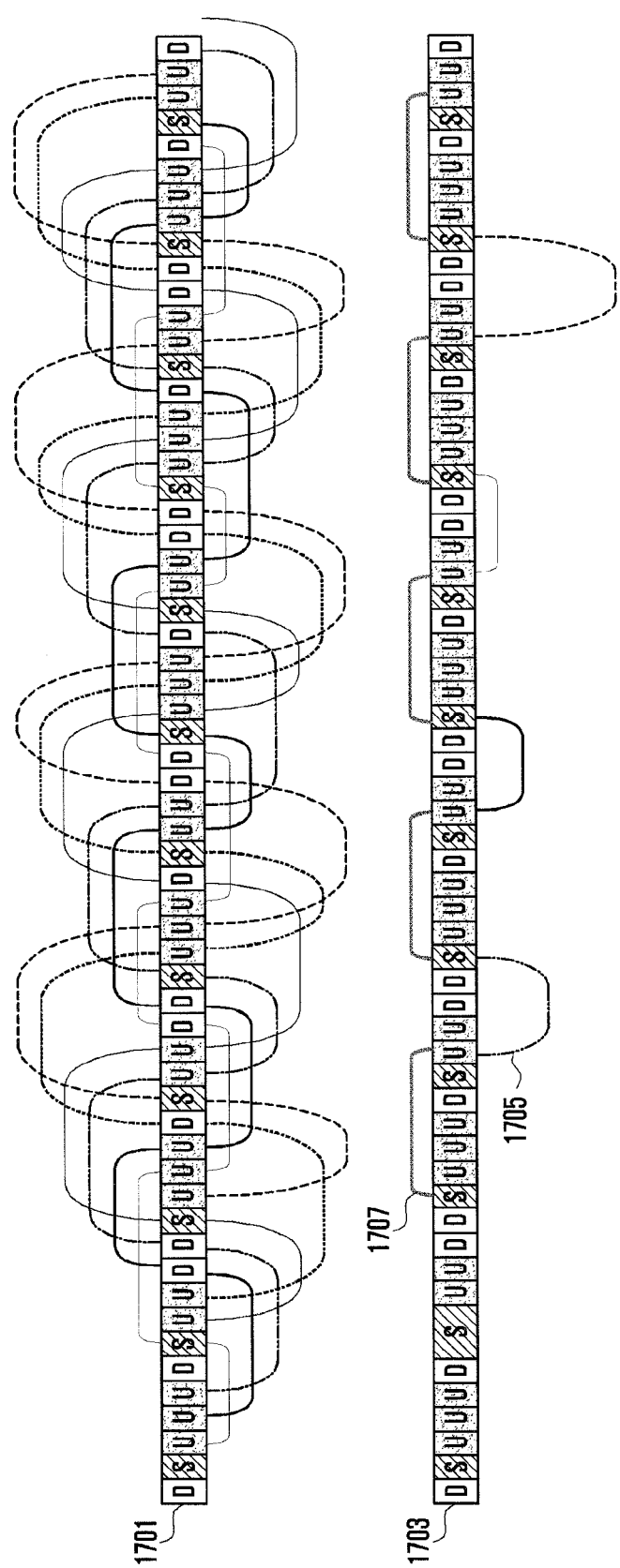
FIG. 13 illustrates an SCell UL HARQ timing relationship with a cross-carrier scheduling when the SCell is a UL subset of a PCell and the PCell operates with configuration 6 according to a ninth exemplary embodiment of the present invention.

FIG. 13 illustrates an SCell UL HARQ timing relationship with a cross-carrier scheduling when the SCell is a UL subset of a PCell and the PCell operates with configuration 6 according to a ninth exemplary embodiment of the present invention.

Since total 6 UL HARQ processes perform transmission with 5 UL subframes in the TDD configuration 6, the RTT is 60 msec and, at this time, the UL subframes are configured in unit of radio frame such that all UL HARQ processes do not continue in the SCell when the SCell configuration is a UL subset.

FIG. 13 illustrates an exemplary case of the configuration 6 with 6 UL HARQ processes.

The different color lines indicate different UL HARQ processes. In the ninth exemplary embodiment, the cross-carrier scheduling is performed in such a way that the scheduling-PUSCH timing follows the timing of the configuration 1 and the PUSCH-HARQ timing follows the timing of the PCell when the UL subframes 2, 3, 4, and 6 are aligned with the SCell. This method is advantageous in that since the SCell maintains the RTT of 10 msec, there is no mismatch of scheduling timing and acknowledge channel transmission timing between the HARQ processes of the previous scheduling and current scheduling. In addition, there is no need to define a new timing for scheduling.

Referring to FIG. 13, the PCell operates with configuration 6 as denoted by reference number 1701 while the SCell operates with configuration 1 as denoted by reference number 1703. When transmitting the UL grant at the 2nd subframe through cross-carrier scheduling, the PUSCH timing follows the configuration 1 as denoted by reference number 1707 unlike the PCell, and the PHICH transmission timing follows the timing of the PCell timing 1701 denoted by reference number 1705.

Figure 14:
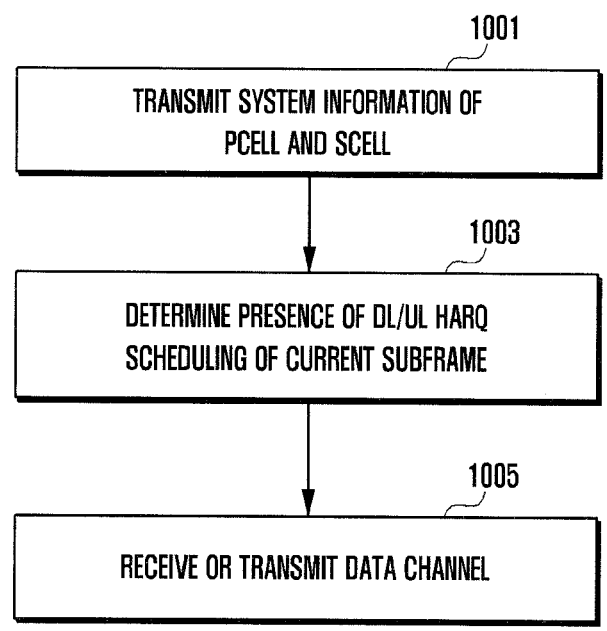
FIG. 14 is a flowchart illustrating an eNB procedure according to an exemplary embodiment of the present invention.

FIG. 14 is a flowchart illustrating an eNB procedure according to an exemplary embodiment of the present invention.

Referring to FIG. 14, the eNB is capable of transmitting the system information to the UE in the PCell and the SCell at step 1001. This step includes transferring the system information including TDD configurations information for the PCell and the SCell that may be imperative for aggregation of carriers with different TDD configurations. The eNB determines whether to perform scheduling DL and UL data transmission at the current subframe at step 1003. The controller responsible for scheduling determines the state of the current subframe in association with the UL or the DL subset/sup-set relationship of the PCell and the SCell configurations, whether the positions of the current subframes and transmission directions of the PCell and the SCell match with each other, and whether the RTT of the PCell is 10 msec to transmit the timings proposed. In this manner, it is possible to transmit the DL and the UL scheduling information to the UE using self-scheduling and the UE using cross-carrier scheduling. At step 1005, the eNB is capable of transmitting or receiving the data channel according to the timings determined at step 1003 according to the data channel or ACK channel transmitted by the UE.

Figure 15:
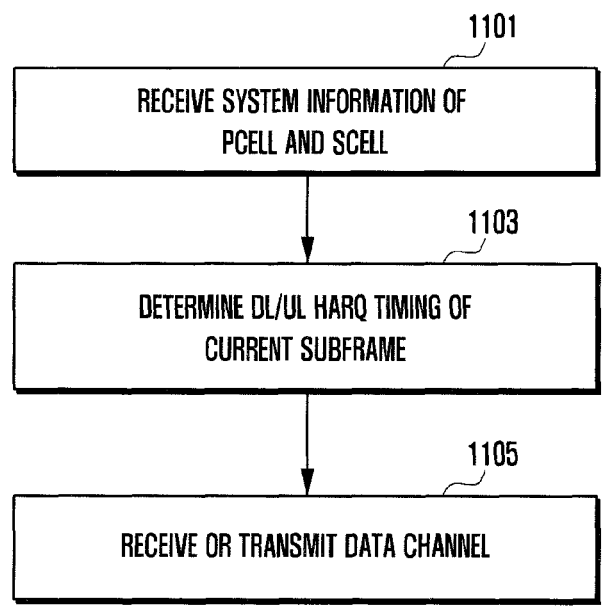
FIG. 15 is a flowchart illustrating a UE procedure according to an exemplary embodiment of the present invention.

FIG. 15 is a flowchart illustrating a UE procedure according to an exemplary embodiment of the present invention.

Referring to FIG. 15, an eNB receives system information of the PCell and the SCell at step 1101. The system information received at step 1101 includes TDD configurations applied to different carriers aggregated. The UE determines, at step 1103, the UL or DL subset/sup-set relationship of the PCell and the SCell configurations, whether the positions of the current subframes and transmission directions of the PCell and the SCell match with each other, whether the RTT of the PCell is 10 msec to transmit the timings proposed, and whether the UE operates with self-scheduling and cross-carrier scheduling based on the received system information. The UE determines the scheduled downlink or ACK channel of uplink or data channel transmission timing based on the determination result. The UE transmits the data channel or receiving the ACK channel or scheduling information based on the timings determined at step 1105.

Figure 16:
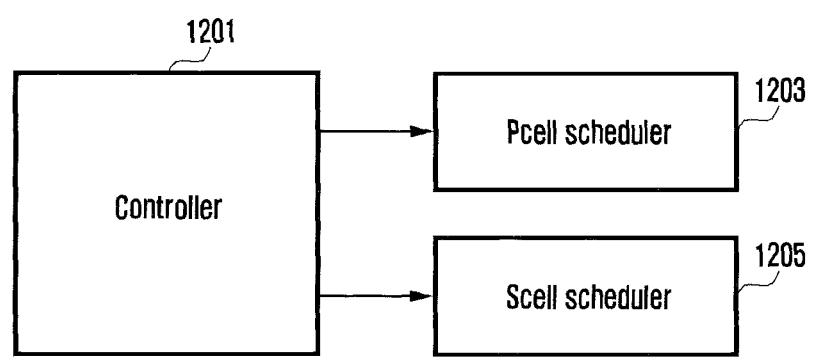
FIG. 16 is a block diagram illustrating a configuration of an eNB according to an exemplary embodiment of the present invention.

FIG. 16 is a block diagram illustrating a configuration of an eNB according to an exemplary embodiment of the present invention.

Referring to FIG. 16, the eNB includes a controller 1201 for determining TDD configurations of configured PCell and SCell and transmission/reception timings of data channel and ACK channels, a PCell scheduler 1203 and an SCell scheduler 1205 that are responsible for the PCell and the SCell data channel and an ACK channel transmission/reception according to the timings determined by the controller.

Figure 17:
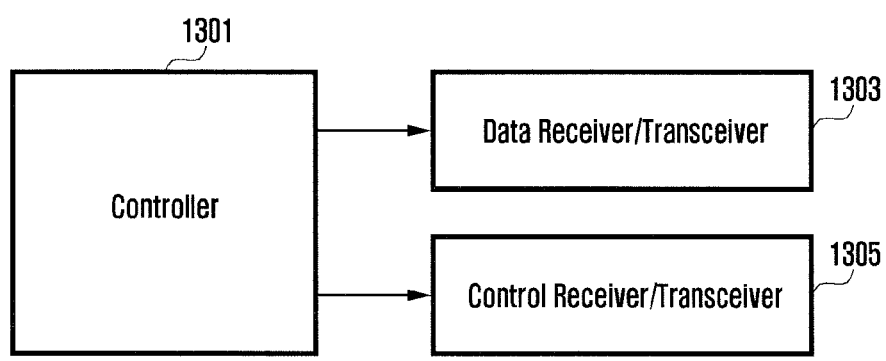
FIG. 17 is a block diagram illustrating a configuration of a UE according to an exemplary embodiment of the present invention.

FIG. 17 is a block diagram illustrating a configuration of a UE according to an exemplary embodiment of the present invention.

Referring to FIG. 17, the UE apparatus includes a controller 1301 for determining the TDD configurations of the configured PCell and SCell, whether downlink and uplink of the subframes match between the PCell and the SCell, and transmission/reception timings. The UE further includes a data transceiver 1303 for receiving and transmitting data channels based on the timings determined by the controller 1301 and an ACK channel transceiver 1305 for transmitting and receiving the ACK channel based on the timings determined by the controller 1301.

Exemplary embodiments of the present invention propose data channel and acknowledge channel timings of the SCell for matching the scheduling timings and ACK channel transmission timing as well as making it possible to perform scheduling at all subframes in transmitting and receiving data channel to and from the UE supporting different TDD configurations-enabled carrier aggregation. The proposed technology is capable of utilizing the timings of the TDD configurations of the related art without extra timing information.

Exemplary embodiments of the present invention relate to a method and an apparatus for transmitting uplink/downlink data on the carriers having different TDD configurations supporting both the self-scheduling and cross-carrier scheduling of the UE using carriers of different TDD configurations so as to transmit acknowledgement channels at the same timings regardless of scheduled carriers.

Exemplary embodiments of the present invention relate to a method and an apparatus for transmitting uplink/downlink data on the carriers having different TDD configurations capable of utilizing the timings defined in the TDD configuration of the related art without additional timing information.

Exemplary embodiments of the present invention are not limited to the aforesaid, and other effects not described herein will be clearly understood by those skilled in the art from the descriptions below.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method in a wireless communication system, the method comprising:
   receiving, by a terminal, a first message including a first uplink/downlink (UL/DL) configuration for a primary cell (PCell) from a base station;
   receiving, by the terminal, a second message including a second UL/DL configuration for a secondary cell (SCell) from the base station;
   receiving, by the terminal, a physical downlink shared channel (PDSCH) on a first subframe of the SCell from the base station; and
   transmitting, by the terminal, a hybrid automatic repeat request-acknowledge (HARQ-ACK) corresponding to the PDSCH on a second subframe to the base station,
   wherein the second subframe is determined based on a scheduling type for the terminal and a relationship between the first UL/DL configuration and the second UL/DL configuration, if the first UL/DL configuration is different from the second UL/DL configuration.

2. The method of claim 1, wherein the scheduling type is one of a self scheduling or a cross-carrier scheduling.

3. The method of claim 1, wherein the second subframe is determined based on whether UL subframes of the SCell is a subset of UL subframes of the PCell.

4. The method of claim 1, wherein the second subframe is determined based on whether DL subframes of the PCell is a subset of DL subframes of the SCell.

5. The method of claim 1, wherein the second subframe is determined based on the second UL/DL configuration for the secondary cell, if the scheduling type for the terminal is a self scheduling and UL subframes of the SCell is a subset of UL subframes of the PCell.

6. The method of claim 1, wherein the second subframe is determined based on the first UL/DL configuration for the PCell, if the scheduling type for the terminal is a cross carrier scheduling and UL subframes of the SCell is a subset of UL subframes of the PCell.

7. A terminal in a wireless communication system, the terminal comprising:

a transceiver configured to transmit and receive a signal; and a controller configured to control:
- to receive a first message including a first uplink/downlink (UL/DL) configuration for a primary cell (PCell) from a base station,
- to receive a second message including a second UL/DL configuration for a secondary cell (SCell) from the base station,
- to receive a physical downlink shared channel (PDSCH) on a first subframe of the SCell from the base station, and
- to transmit a hybrid automatic repeat request-acknowledge (HARQ-ACK) corresponding to the PDSCH on a second subframe to the base station, wherein the second subframe is determined based on a scheduling type for the terminal and a relationship between the first UL/DL configuration and the second UL/DL configuration, if the first UL/DL configuration is different from the second UL/DL configuration.

8. The terminal of claim 7, wherein the second subframe is determined based on whether the scheduling type for the terminal is one of a self scheduling or a cross-carrier scheduling.

9. The terminal of claim 7, wherein the second subframe is determined based on whether UL subframes of the SCell is a subset of UL subframes of the PCell.

10. The terminal of claim 7, wherein the second subframe is determined based on whether DL subframes of the PCell is a subset of DL subframes of the SCell.

11. The terminal of claim 7, wherein the second subframe is determined based on the second UL/DL configuration for the SCell, if the scheduling type for the terminal is a self scheduling and UL subframes of the SCell is a subset of UL subframes of the PCell.

12. The terminal of claim 7, wherein the second subframe is determined based on the first UL/DL configuration for the PCell, if the scheduling type for the terminal is a cross carrier scheduling and UL subframes of the SCell is a subset of UL subframes of the PCell.

13. A method in a wireless communication system, the method comprising:
- transmitting, by a base station, a first message including a first uplink/downlink (UL/DL) configuration for a primary cell (PCell) to a terminal;
- transmitting, by the base station, a second message including a second UL/DL configuration for a secondary cell (SCell) to the terminal;
- transmitting, by the base station, a physical downlink shared channel (PDSCH) on a first subframe of the SCell to the terminal; and
- receiving, by the base station, a hybrid automatic repeat request-acknowledge (HARQ-ACK) corresponding to the PDSCH on a second subframe from the terminal, wherein the second subframe is determined based on a scheduling type for the terminal and a relationship between the first UL/DL configuration and the second UL/DL configuration, if the first UL/DL configuration is different from the second UL/DL configuration.

14. The method of claim 13, wherein the second subframe is determined based on whether the scheduling type for the terminal is one of a self scheduling or a cross-carrier scheduling.

15. The method of claim 13, wherein the second subframe is determined based on whether UL subframes of the SCell is a subset of UL subframes of the PCell.

16. The method of claim 13, wherein the second subframe is determined based on whether DL subframes of the PCell is a subset of DL subframes of the SCell.

17. The method of claim 13, wherein the second subframe is determined based on the second UL/DL configuration for the SCell, if the scheduling type for the terminal is a self scheduling and UL subframes of the SCell is a subset of the UL subframes of the PCell.

18. The method of claim 13, wherein the second subframe is determined based on the first UL/DL configuration for the PCell, if the scheduling type for the terminal is a cross carrier scheduling and UL subframes of the SCell is a subset of UL subframes of the PCell.

19. A base station in a wireless communication system, the base station comprising:

a transceiver configured to transmit and receive a signal; and a controller configured to control:
- to transmit a first message including a first uplink/downlink (UL/DL) configuration for a primary cell (PCell) to a terminal,
- to transmit a second message including a second UL/DL configuration for a secondary cell (SCell) to the terminal,
- to transmit a physical downlink shared channel (PDSCH) on a first subframe of the SCell to the terminal, and
- to receive a hybrid automatic repeat request-acknowledge (HARQ-ACK) corresponding to the PDSCH on a second subframe from the terminal, wherein the second subframe is determined based on a scheduling type for the terminal and a relationship between the first UL/DL configuration and the second UL/DL configuration, if the first UL/DL configuration is different from the second UL/DL configuration.

20. The base station of claim 19, wherein the second subframe is determined based on whether the scheduling type for the terminal is one of a self scheduling or a cross-carrier scheduling.

21. The base station of claim 19, wherein the second subframe is determined based on whether UL subframes of the SCell is a subset of UL subframes of the PCell.

22. The base station of claim 19, wherein the second subframe is determined based on whether DL subframes of the PCell is a subset of DL subframes of the SCell.

23. The base station of claim 19, wherein the second subframe is determined based on the second UL/DL configuration for the (SCell), if the scheduling type for the terminal is a self scheduling and UL subframes of the SCell is a subset of UL subframes of the PCell.

* * * * *